3,123,165
FRICTION-FREE BALANCE
Neill J. Carson, Jr., Lockport, Herbert W. Ostrander, Westmont, and Carl N. Munter, Harvey, Ill., assignors to the United States of America as represented by the United States Atomic Energy Commission
Filed June 23, 1961, Ser. No. 119,248
3 Claims. (Cl. 177—208)

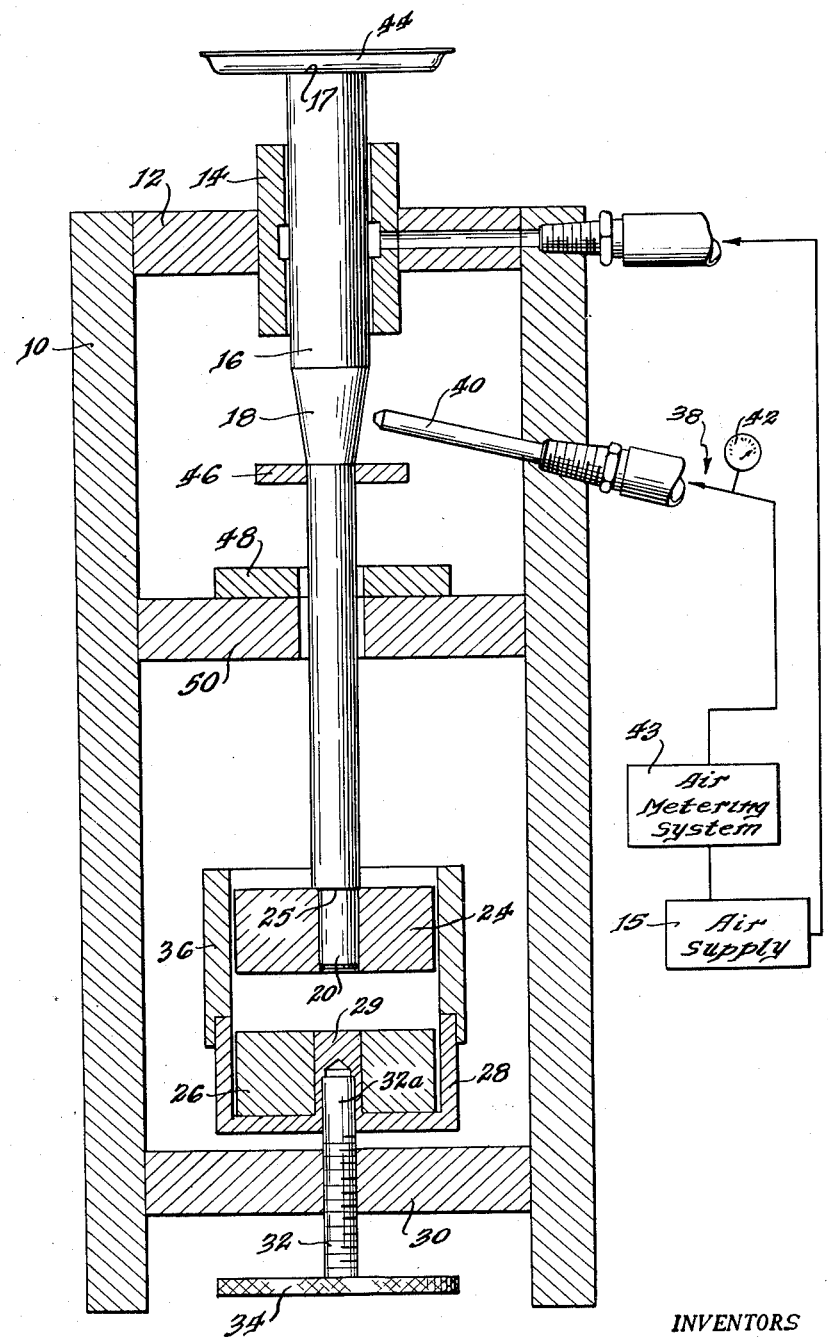

This invention relates to a novel construction for a balance, or scale.

Balances ordinarily have been made with delicate knife edges mounted on fragile sapphires or agates to reduce friction. Such mountings must be protected from shock and vibration, and must be kept free of dust for continued accuracy. Delicate balances usually are constructed with elongated beams which require space-consuming housings. It is frequently necessary to make minor adjustments and repairs on balances. This is difficult, if not impossible in remote installations where radioactive materials are involved. Where repair is impossible, disposal of contaminated equipment becomes a problem, since space requirements for disposal frequently represent rather expensive investments. Some balances have been made using magnetic counter-balances but these have been associated with conventional levers and knife-edge mechanisms.

The device of this invention is a rugged, compact balance of a novel type which is capable of a relatively high degree of accuracy as well as sensitivity, and which is adaptable for remote operation. This balance utilizes a friction-free air bearing combined with a frictionless, magnetic counter-balance and a means for sensing weight by an air gauge which likewise leaves the balance friction-free. The moving parts in this balance are totally isolated by at least a thin layer of gas or air. Using this novel combination, we have constructed a balance which occupies only a fraction of the space normally required for a balance, and which may be subjected to considerable vibration and shock without damage. This balance is relatively inexpensive and comparatively simple to build. There is no friction between moving parts, so no lubrication is required, and maintenance is eliminated. These features coupled with a remote indicating means make this balance ideally suited for use in radioactive areas. This balance is particularly well adapted to a "go, no-go" type of weighing, since it has a direct-reading weight indicator, and may be constructed with sensitivity in a specific weight range. Balance weights are eliminated except for use in calibration of the indicator.

It is an object of this invention to provide a rugged balance which is free from the limitations of delicate knife-edge types of mechanisms.

It is also an object of this invention to provide an unusually compact balance.

A further object of this invention is to provide a friction-free balance requiring little or no maintenance for use in remote areas.

Other objects and advantages will be apparent from the description and the drawing in which:

The figure is a sectional view, partly diagrammatic, showing one embodiment of this invention.

An aluminum frame 10 has a top plate 12 providing a mount for an air bearing 14, which may be constructed according to known principles such as are disclosed in U.S. Patent No. 1,906,715. Such a bearing maintains a friction-free film of compressed air between moving parts. The compressed air for the air bearing 14 in this balance is obtained as shown diagrammatically from an air supply 15. A vertical aluminum shaft 16 is radially supported at a region of appreciable length near its top end 17, by the air bearing 14. The shaft 16 has a tapered portion 18 below the air bearing 14 and a bottom end 20. The tapered portion 18 may be tapered in any of several ways, but we prefer to use an inverted conical taper.

The bottom end 20 of the shaft 16 fits a central opening in a washer-shaped magnet 24, which is held on the shaft 16 against a shoulder 25 formed thereon, by the repelling force of washer-shaped magnet 26. The latter rests in an aluminum cup 28 and has a central opening fitting a central internal post 29 attached to the base of the cup and coaxial with the shaft 16. The cup 28 is supported on a bottom plate 30 of the frame 10 by means of a screw 32 which is threaded through the bottom plate and has an unthreaded end portion 32a fitting a recess formed in the cup 28 and extending into the post 29. The lower end of the screw 32 has an adjusting wheel 34. A copper dampening sleeve 36 is mounted on the cup 28 coaxially with the shaft 16 and surrounds the magnet 24 in slightly spaced relation. Magnets 24 and 26 are installed so that like poles repel each other with sufficient force to support the shaft 16.

An air gauge 38, including a nozzle portion 40 and an indicator 42 for sensing internal back pressure, delivers air from an air metering system 43 which is connected to the air supply 15. Air from the air gauge is directed against the tapered portion 18 of the shaft 16. As the distance decreases between the nozzle 40 and the tapered portion 18, internal back pressure increases in the gauge 38. The gauge may be of the type shown in FIG. 1 of U.S. Patent No. 2,692,498.

As applied to this invention, the air gauge 38 is used to indicate the weight of an object placed in a pan 44 attached to the top end 17 of the shaft 16. This is accomplished by calibrating the indicator 42 of the air gauge 38 to read weight instead of distance. The greater the weight of the object in the pan 44, the closer the magnets 24 and 26 must be to repel one another with sufficient force to balance the combined weight of the object, pan 44, and shaft 16. The closer the magnets 24 and 26, the lower the shaft 16, and the smaller the distance between the nozzle 40 and the tapered portion 18 of the shaft 16.

A "zero" adjustment for the weight indicator 42 is accomplished by raising or lowering the magnet 26. This adjustment may be made easily in remote installations by turning the adjusting wheel 34.

The sensitivity of this balance is determined in part by the degree of taper of the tapered portion 18 and in part by the strength of the magnets 24 and 26. The repelling force between the magnets 24 and 26 varies inversely with the square of the distance between them. Therefore the sensitivity of this balance would decrease with increasing weight. To partially counteract this effect, there are provided a ferromagnetic annular disk 46 and a magnet 48, the disk being attached to the shaft 16 below the tapered portion 18 and the magnet being attached to an intermediate member 50 of the frame 10 and loosely receiving the shaft 16 in a central opening. Thus increased attraction between magnet 48 and disk 46 partially offsets the increased repulsion between magnets 24 and 26 as the distance between the latter is decreased. This tends to maintain the sensitivity of the balance when weighing heavier objects.

The magnets used in the embodiment shown in the drawing are made of a ceramic magnet material, barium ferrite ($BaFe_{12}O_{19}$), which is well known to those skilled in the art.

A novel balance construction has been achieved by means of this invention with an unusual combination of supporting, balancing, and sensing elements all of which cooperate to form a balance having an unusual freedom from friction. The novel combination of elements herein has provided at the same time an unusually shock-resistant balance in spite of a seemingly delicate nature. This balance requires no lubrication and no maintenance since there are no operatively connected elements which would result in friction or wear.

This invention is not limited to the exact details disclosed, but may be embodied in other forms within the scope of the appended claims.

What is claimed is:

1. A balance for determining the weight of an object, comprising a frame having a top plate and a bottom plate; an air bearing attached to the top plate of the frame and having a vertical axis; a vertical shaft extending through the air bearing so as to be radially supported thereby, said shaft having an axially tapered portion; a first washer-shaped magnet attached to the bottom end of the shaft; a second washer-shaped magnet carried by the bottom plate of the frame below the first magnet, said magnets being arranged in spaced-apart, mutually repelling relationship and having magnetic fields radially symmetrical with respect to the axis of the shaft; and a weight-calibrated air gauge attached to the frame adjacent the tapered portion of the shaft, said air gauge being responsive to back pressure, said back pressure being related to the proximity of the tapered portion to the air gauge, which proximity is dependent on the weight of the object placed on the top end of the shaft.

2. A balance for determining the weight of an object comprising a frame having a top plate and a bottom plate; an air bearing attached to the top plate of the frame and having a vertical axis; a vertical shaft extending through the air bearing so as to be radially supported thereby, said shaft having a portion of its surface axially tapered and a shoulder near its bottom end; a washer-shaped first magnet fitting the bottom end of the shaft and engaging the shoulder; a washer-shaped second magnet; a support for carrying the second magnet on the bottom plate of the frame below the first magnet, the support having a central post coaxial with the shaft and fitting the second magnet, said magnets having like poles adjacent for mutual repulsion; said magnets having magnetic fields radially symmetrical with respect to the vertical shaft; means attached to the support for dampening movement of said first magnet; means attached to said support for vertically varying the position of the second magnet relative to the support; and a weight-calibrated air gauge mounted on the frame adjacent the tapered portion of the shaft, said air gauge being responsive to internal back pressure, said back pressure being related to the proximity of the tapered portion to the air gauge, which proximity is dependent on the weight of the object placed on the top end of the shaft.

3. A balance for determining the weight of an object, comprising a frame having a top plate and a bottom plate; an air bearing attached to the top plate of the frame and having a vertical axis; a vertical shaft extending through the air bearing so as to be radially supported thereby, said shaft having a portion of its surface axially tapered and a shoulder near its bottom end; a washer-shaped first magnet fitting the bottom end of the shaft and engaging the shoulder; a washer-shaped second magnet; a support for carrying the second magnet on the bottom plate of the frame below the first magnet, the support having a central post coaxial with the shaft and fitting the second magnet, said magnets having like poles adjacent for mutual repulsion; a dampening sleeve carried by the support coaxially with the shaft and surrounding the first magnet in slightly spaced relation; an intermediate support attached to the frame and positioned above the first magnet; a third magnet attached to the intermediate support; a ferromagnetic member attached to the shaft adjacent the third magnet; and a weight-calibrated air gauge mounted on the frame adjacent the tapered portion of the shaft, said air gauge being responsive to internal back pressure, said back pressure being related to the proximity of the tapered portion to the air gauge, which proximity is dependent on the weight of the object placed on the top end of the shaft.

References Cited in the file of this patent

UNITED STATES PATENTS

| | | |
|---|---|---|
| 1,906,715 | Penick | May 2, 1933 |
| 2,148,523 | Baermann | Feb. 28, 1939 |
| 2,559,919 | Gustafsson | July 10, 1951 |
| 2,692,498 | Knobel | Oct. 26, 1954 |